(12) United States Patent
Singh

(10) Patent No.: US 7,330,217 B1
(45) Date of Patent: Feb. 12, 2008

(54) CHROMA PHASE ERROR CORRECTION CIRCUITRY AND METHODS AND SYSTEMS UTILIZING THE SAME

(75) Inventor: Rahul Singh, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 515 days.

(21) Appl. No.: 10/969,277

(22) Filed: Oct. 20, 2004

(51) Int. Cl.
*H04N 9/455* (2006.01)
*H04N 9/66* (2006.01)

(52) U.S. Cl. ............... 348/505; 348/508; 348/549; 348/639

(58) Field of Classification Search ........... 348/505, 348/536, 507–509, 537, 549, 638–641, 726, 348/727; 375/326, 327, 344, 354, 362, 375, 375/376; H04N 9/455, 9/66, 5/455
See application file for complete search history.

(56) References Cited

U.S. PATENT DOCUMENTS 4,689,664 A    8/1987  Moring et al.
4,703,340 A *  10/1987 Balaban et al. ............. 348/505
6,034,735 A *  3/2000  Senbongi et al. ........... 348/505

FOREIGN PATENT DOCUMENTS

JP    11355796 A  * 12/1999

\* cited by examiner

*Primary Examiner*—Sherrie Hsia
(74) *Attorney, Agent, or Firm*—James J. Murphy; Thompson & Knight LLP

(57) ABSTRACT

Chrominance phase error correction circuitry includes a demodulator for demodulating a received video color burst signal into first and second demodulated signals and signal generation circuitry for providing to the demodulator a demodulating signal for demodulating video color burst signal. Phase correction circuitry detects a phase error from the first and second demodulated signals and varies a phase of the demodulating signal to provide a corrected demodulating signal for demodulating a video chrominance signal with the demodulator during an active video period.

20 Claims, 4 Drawing Sheets

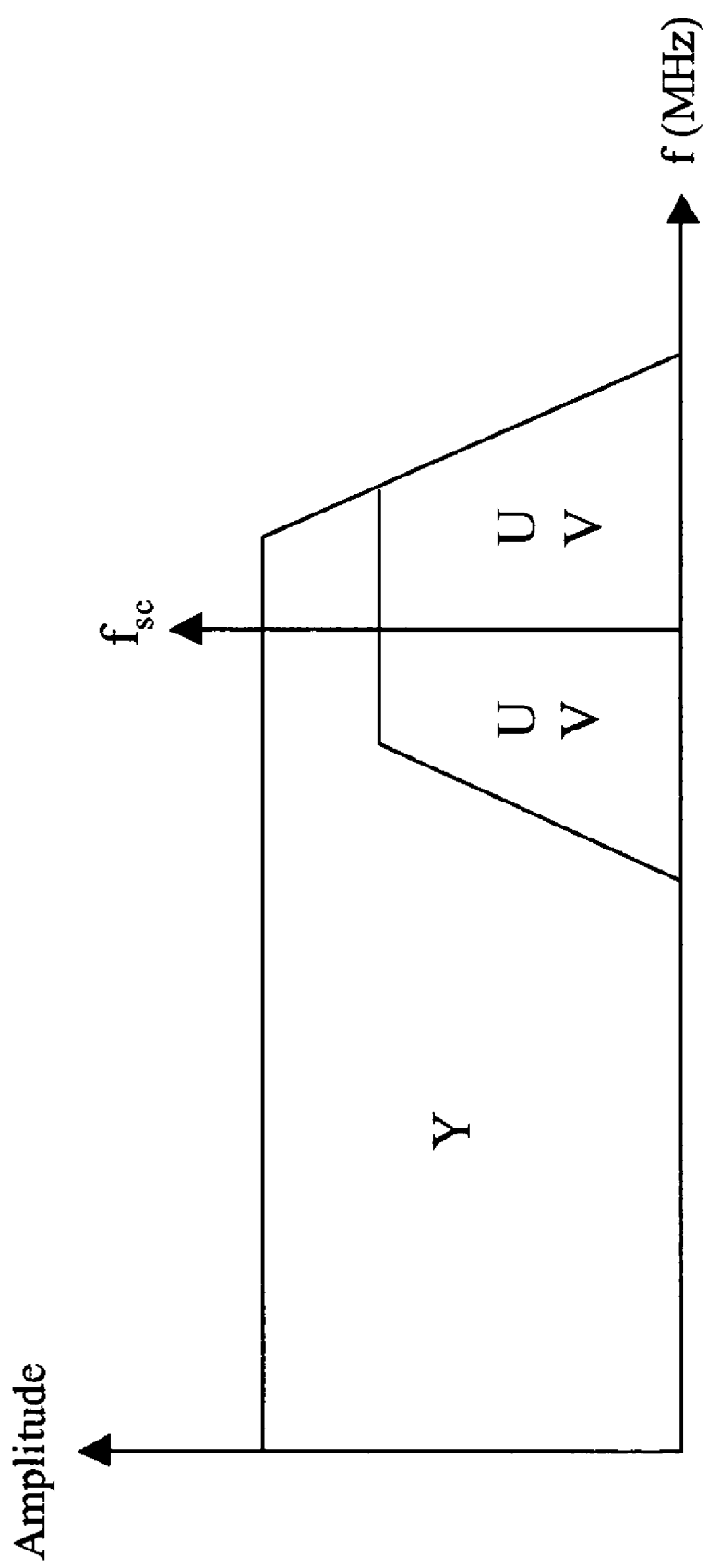

CHROMA PHASE ERROR CORRECTION CIRCUITRY AND METHODS AND SYSTEMS UTILIZING THE SAME

FIELD OF INVENTION

The present invention relates in general to video processing, and in particular, to chroma phase error correction circuitry and methods and systems utilizing the same.

BACKGROUND OF INVENTION

In both the National Television System Committee (NSTC] and Phase Alternating Line (PAL) standard video systems, video data may be transmitted as a single composite signal carrying both brightness and color information. Specifically, a composite video signal includes synchronization information, a luminance (Y) component and a chrominance or "chroma" (C) component. The C component is generated by modulating U and V color components with a color subcarrier of a given color subcarrier frequency, in which the U component is the difference between the Y component and the blue color content and the V component is difference between the Y component and the red color content.

In both the NTSC and PAL systems, frames of composite video data are transmitted as two interleaved fields of lines of display pixels. Generally, each line of pixels is transmitted as a horizontal synchronization signal, a color burst signal, and the active composite video Y and C components. The horizontal synchronization signal indicates the start of the transmission of the line and gates the following color burst signal into the color synchronization circuitry. As discussed below, the color burst signal controls the recovery of the U and V color components from the received C component during demodulation. Generally, the color burst is a sample of video data represented by the subcarrier signal, which has been modulated such that the V component has a zero (0) value and the U component has a non-zero value.

A typical composite video decoder in the receiving system includes a phase locked loop, which generates cosine and sine signals at the color subcarrier frequency for demodulating the C component of the composite video signal. Specifically, the cosine and sine signals are locked in phase and frequency to the color subcarrier frequency of color burst signal of each received line. The cosine and sine signals are locked in frequency and ninety degrees (90°) out-of-phase with respects to each other. Generally, the cosine signal demodulates the C component of the composite video signal to recover the V color component and the sine signal demodulates the C component of the composite video signal to recover the U color component, following separation of the Y and C components.

Even though the color burst signal is locked in phase within three (3) degrees of phase of the locally generated sine signal, the remaining three (3) degrees of phase error still introduces anomalies in the ultimate video display. For example, in NTSC systems, phase error between the color burst signal and the locally generated sine signal, and hence the associated cosine signal as well, can cause a constant color shift in the video display. In PAL systems, this phase error can result in unwanted line-to-line patterns known as "Hanover Bars" in the video display.

In the past, video systems processing composite video signals have generally addressed the problem of phase error between the color burst signal and the locally generated cosine and sine signals by averaging equal contributions of chrominance data for even and odd display lines. These existing techniques, however, are only applicable for processing constant color display regions and desaturate the U and V components.

Hence, in order to minimize anomalies in the video display systems operating on composite video, new techniques are required for addressing the problem of phase error between a received color burst signal and the local cosine and sine signals required for color component recovery. These techniques should be applicable to both NTSC and PAL standard systems, although not necessarily limited thereto.

SUMMARY OF INVENTION

The principles of the present invention advantageously allow for the minimization of phase differences between the color subcarrier of a composite video signal and the local signals utilized to demodulate the color information within that composite video signal. According to one particular embodiment of these principles, chrominance phase error correction circuitry is disclosed which includes a demodulator for demodulating a received video color burst signal into first and second demodulated signals and signal generation circuitry for providing to the demodulator a demodulating signal for demodulating the video color burst signal. The chrominance phase error correction circuitry further includes phase correction circuitry for detecting a phase error from the first and second demodulated signals and varying a phase of the demodulating signal relative to the phase of the color burst signal to provide at least one corrected demodulating signal for demodulating a video chrominance signal with the demodulator during an active video period.

Embodiments of the principles of the present invention allow the color subcarrier carrying each row of display data in a composite video signal to be closely matched in phase with the local demodulating signals utilized to demodulate the embedded chrominance information. The inventive principles may be applied to systems operating in accordance with either the NTSC or PAL standards. Advantageously, anomalies in the ultimate video display, such as color shifts and/or Hanover bars, are eliminated or substantially reduced.

BRIEF DESCRIPTION OF DRAWINGS

For a more complete understanding of the present invention, and the advantages thereof, reference is now made to the following descriptions taken in conjunction with the accompanying drawings, in which:

FIG. 2A is an amplitude versus frequency plot of a representative composite video signal;

DETAILED DESCRIPTION OF THE INVENTION

Figure 1:
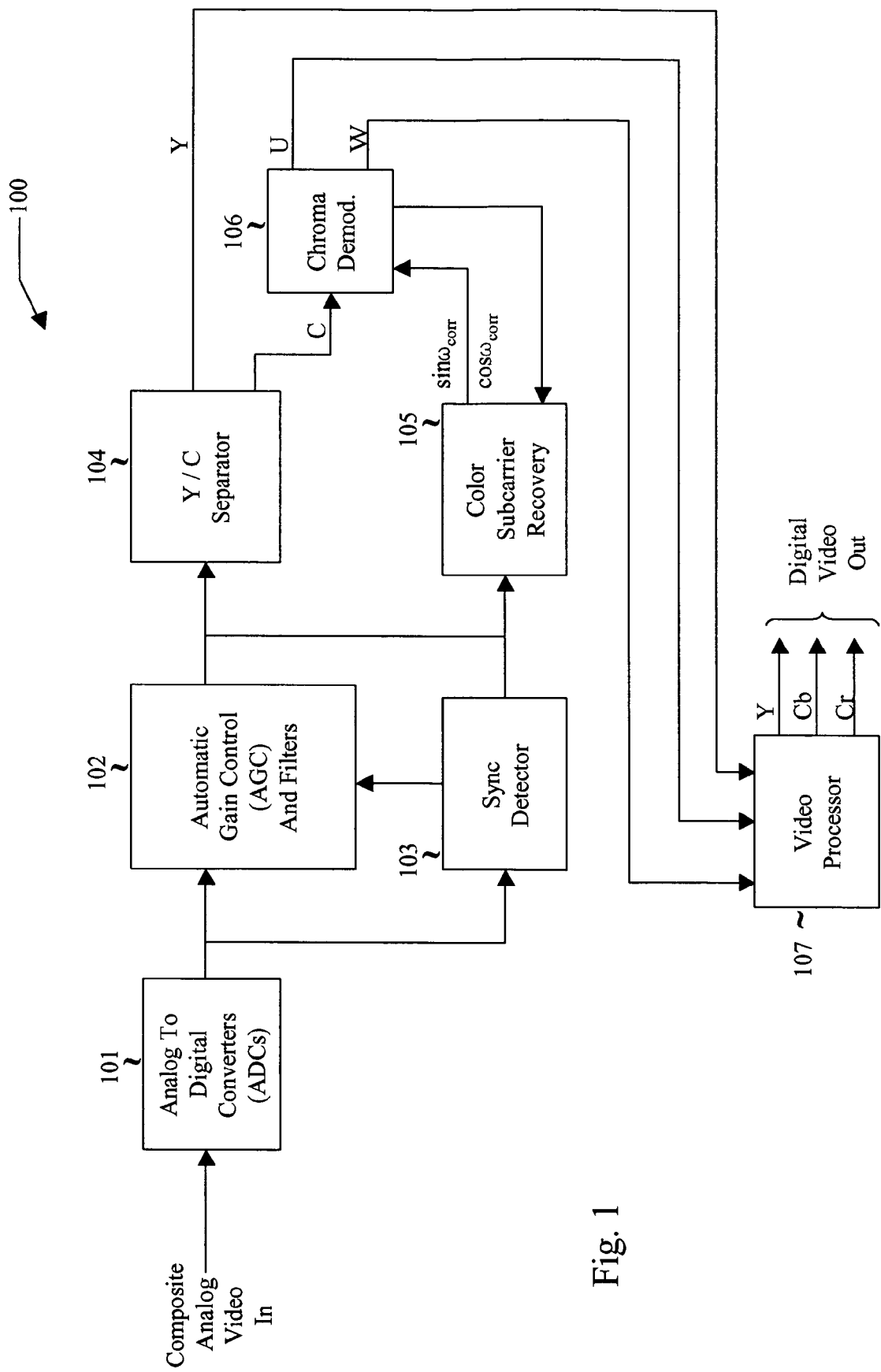
FIG. 1 is a high level block diagram of an exemplary analog to digital video decoder suitable for describing the present inventive principles.
Figure 2B:
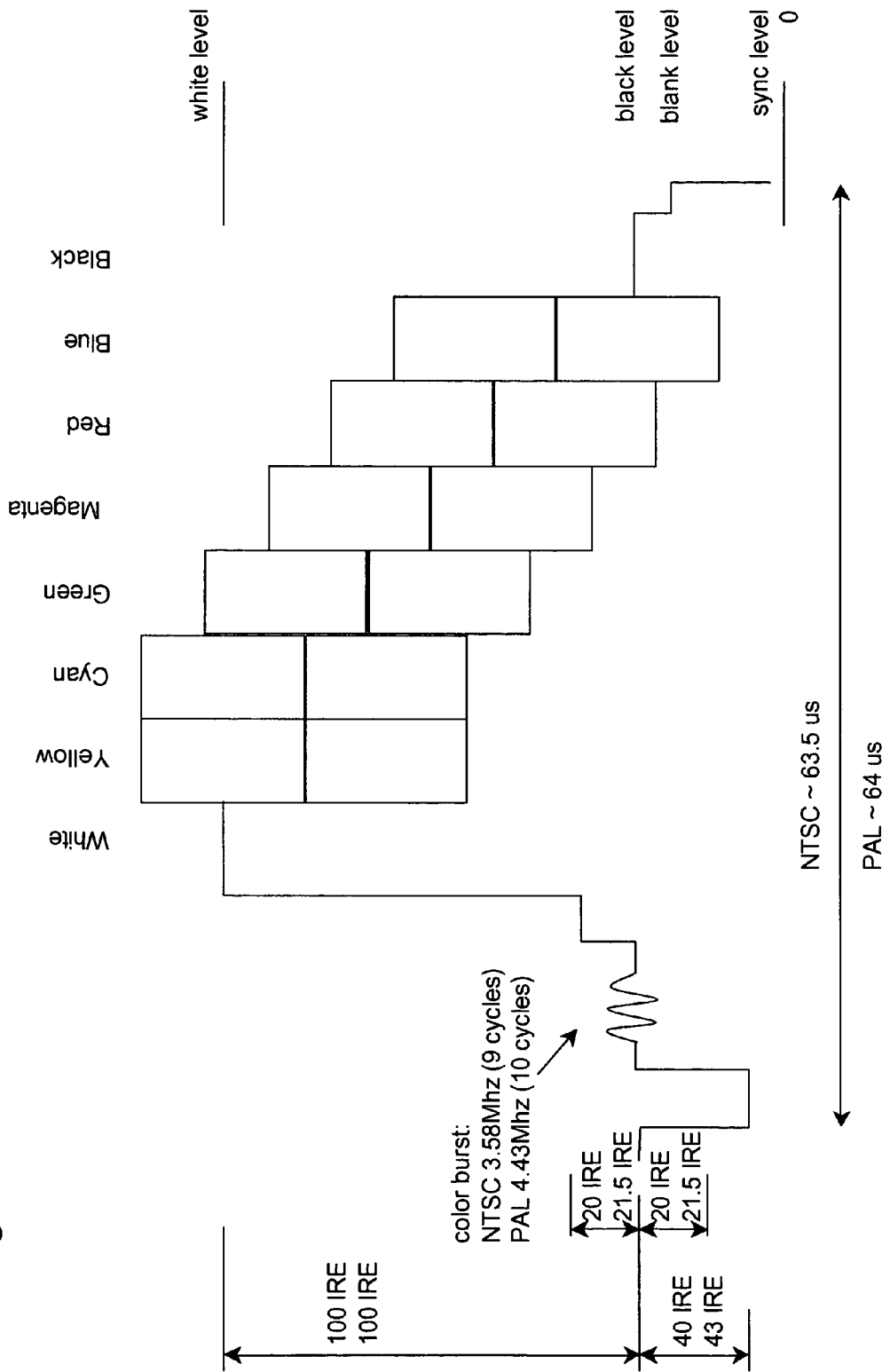
FIG. 2B is an amplitude versus time slot illustrating one line of representative display data in the composite video format.
Figure 3:
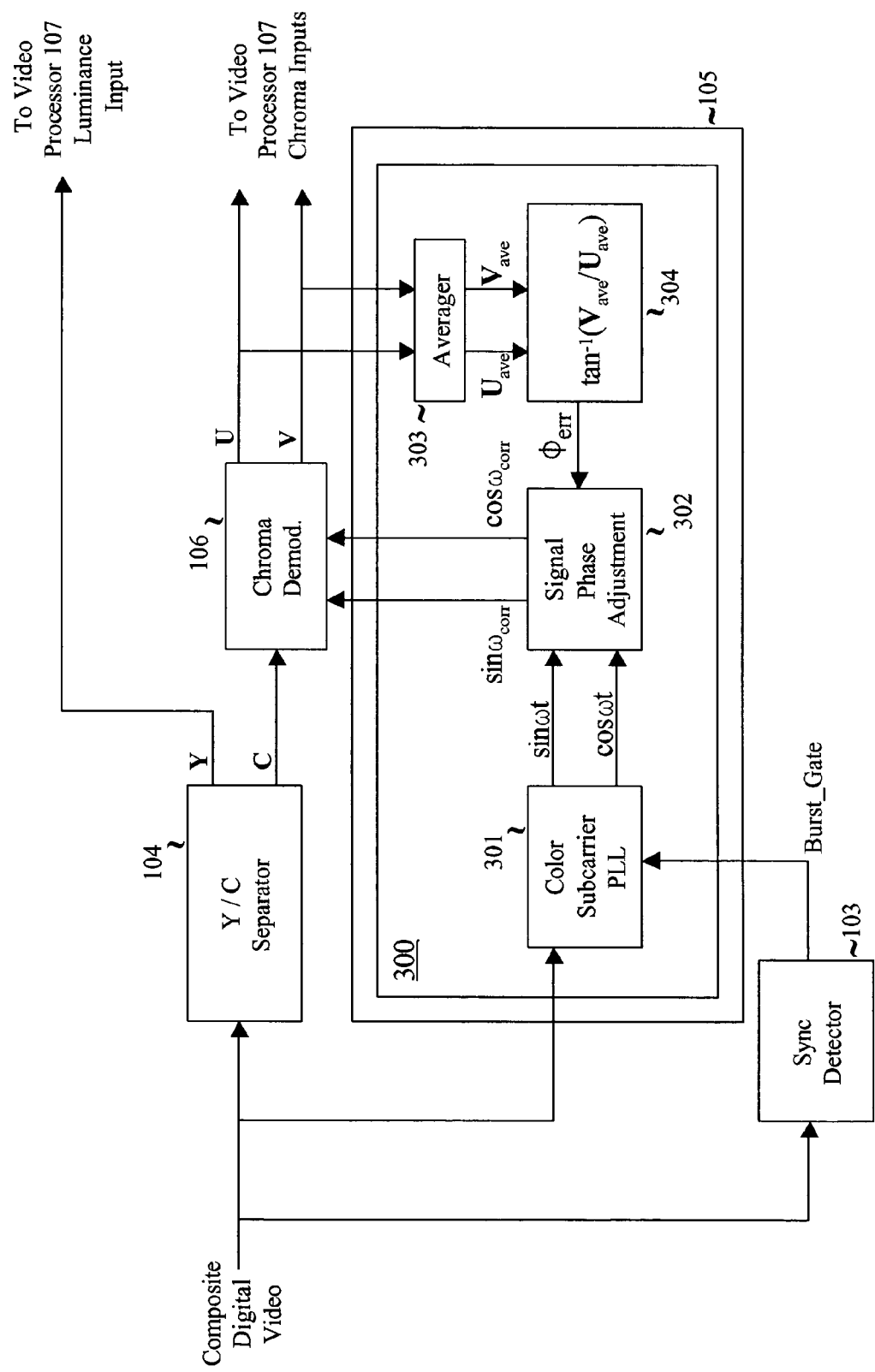
FIG. 3 illustrates in further detail the color subcarrier recovery and chroma demodulation blocks of FIG. 1, and emphasizing exemplary chroma phase error correction circuitry embodying the present inventive principles.

The principles of the present invention and their advantages are best understood by referring to the illustrated embodiment depicted in FIGS. 1-3 of the drawings, in which like numbers designate like parts.

FIG. 1 is a diagram of an exemplary analog to digital video decoder 100 suitable for describing the principles of the present invention. In the illustrated embodiment, video encoder converts a composite analog video input signal, in the YC format, into digital video data in the YCrCb component video format, although the inventive principles are not necessarily limited thereto.

In video encoder 100, the composite analog input video is converted into composite digital video in the YC format by analog to digital converters (ADCs) 101. The digitized YC video data are then passed through automatic gain control (AGC) and filter block 102. A sync detector 103 detects the vertical synchronization (VSYNC) signal, which controls the timing of the playback of each display field, and the horizontal synchronization signal (HSYNC), which controls the timing the playback of each display line.

Y/C separator block 104 next separates the digital Y and C components of the digitized composite video data stream. The C component is demodulated into U and V color components by color subcarrier recovery block 105 and chroma demodulation block 106, described in further detail below. The Y component is passed directly to video processor 107 for further processing to generate the Y component of the output YCrCb digital component video signal.

FIG. 2A is an amplitude versus frequency plot of a representative composite video signal. In the NTSC system, the color subcarrier frequency $f_{sc}$ is 3.58 MHz and the composite signal is represented as:

Composite=$Y+U \sin \omega t+V \cos \omega t$ in which Y is the luminance component, U is the difference between Y component and the blue color content, V is the difference between the Y component and the red color content, $\omega=2\pi f_{sc}$, and the chroma component C=$U \sin \omega t+V \cos \omega$.

For an PAL system, the color subcarrier frequency is 4.43 MHz and the composite signal is represented as:

Composite=$Y+U \sin \omega t \pm V \cos \omega t$.

FIG. 2B illustrates one display line of pixels as composite video data, for both the NTSC and PAL system. Vertically, representations are made in Institute of Radio Engineers (IRE) units, and horizontally, are made in units of time. Generally, each line is initiated with the HSYNC pulse, followed by the color burst signal, which is essentially a sample of the color subcarrier, and finally the actual Y and C modulated data in the active video region FIG. 3 is a block diagram of the chroma recovery and demodulation portions of video encoder 100 of FIG. 1, and emphasizing a chroma phase error correction circuit 300 embodying the principles of the present invention. During demodulation of the C component, chroma demodulator 106, shown in both FIGS. 1 and 3, first multiplies the C component output of Y/C separator block 104 respectively by two (2) times the corrected demodulating signal $\sin(\omega t)_{corr}$ and two (2) times the corrected demodulating signal $\cos(\omega t)_{corr}$, from color subcarrier recovery block 105, to generate two intermediate signals M1 and M2. The angular frequency $\omega=2\pi f_{sc}$, as described above. For an NTSC system:

$M1 = U - U \cos 2\omega t_{corr} + V \sin 2\omega t_{corr}$ $M2 = V + V \cos 2\omega t_{corr} + U \sin 2\omega t_{corr}$ For a PAL system:

$M1 = U - U \cos 2\omega t_{corr} \pm V \sin 2\omega t_{corr}$ $M2 = V + V \cos 2t\omega_{corr} \pm U \sin 2\omega t_{corr}$ For either the NTSC or the PAL systems, chroma demodulator 106 then extracts the U and V components by performing low pass filtering on the intermediate signals M1 and M2 to remove the high frequency signals at the angular frequency $2\omega t$.

The corrected signals $\sin(\omega t)_{corr}$ and $\cos(\omega t)_{corr}$ are generated by chroma phase correction circuitry 300 within color subcarrier recovery block 105 of FIG. 1. Advantageously, chroma phase correction circuitry 300 minimizes the phase error between the local $\sin(\omega t)_{corr}$ and $\cos(\omega t)_{corr}$ signals and the color subcarrier. Consequently, anomalies in the video display, such as color shifts and Hanover Bars, are correspondingly minimized.

In the illustrated embodiment, a color subcarrier PLL 301 generates uncorrected local signals $\sin(\omega t)$ and $\cos(\omega t)$, which are locked in phase within three degrees (3°) of the color burst signal received with each received display line of composite video data. In particular, color subcarrier PLL 301 locks to an average frequency of the color burst signals of many display lines, which introduces the phase error discussed below. Sync detector 103 generates a BURST_GATE signal, which gates the received color burst to color subcarrier PLL 301 in response to the preceding HSYNC pulse for the corresponding display line of data.

The uncorrected signals $\sin(\omega t)$ and $\cos(\omega t)$ are adjusted in phase by signal phase adjustment block 302 to generate the corrected local signals $\sin(\omega t)_{corr}$ and $\cos(\omega t)_{corr}$. Specifically, averaging circuitry 303 takes the average value of the demodulated U and V color components output from chroma demodulator 106. An error correction value $\phi$ is determined by error calculation block 304 as the inverse tangent of the averaged values $U_{ave}$ and $V_{ave}$:

$\phi = \tan^{-1}(V_{ave}/U_{ave})$

Ideally, if the uncorrected signal $\sin(\omega t)$ were exactly locked in phase with the color burst signal during the color burst period, the U color component would have an amplitude proportional to the amplitude of color burst signal and the V color component would have an amplitude of zero (0). In this case, the value of $\phi = \tan^{-1}(V_{ave}/U_{ave})$ also would equal zero (0). However, in actual applications, a phase error of up to plus or minus three degrees (±30) will typically exist between the color burst signal and the uncorrected $\sin(\omega t)$ signal, and hence the value of V during the color burst period and phase correction value $\phi$ will have non-zero values.

Phase correction value $\phi$ is fed-back to signal phase adjustment block 302, which adjusts the phase of the uncorrected signals $\sin(\omega t)$ and $\cos(\omega t)$ and to generate the corrected signals $\sin(\omega t)_{corr}$ and $\cos(\omega t)_{corr}$.

During the active video region period of the corresponding display line, the corrected signals $\sin(\omega t)_{corr}$ and $\cos(\omega t)_{corr}$ are utilized to generate the U and V color components, which are then passed to video processor to generate the digital chrominance components Cb and Cr. In the illustrated embodiment, error calculation block 304 is inactive and the value of $\phi$ of the phase error is kept constant during the active video region.

In the illustrated embodiment, color subcarrier PLL 301 phase locks the uncorrected signals $\sin(\omega t)$ and $\cos(\omega t)$ within ±three (3) degrees of the phase of the color burst. Hence, only small values of phase correction value φ must be generated. Consequently, error calculation block 304 is preferably based on a lookup table stored in non-volatile memory, or similar relatively uncomplicated circuitry.

Advantageously, corrected signals $\sin(\omega t)_{corr}$ and $\cos(\omega t)_{corr}$ are generated for every display line of each display frame. Hence, even though color subcarrier PLL 311 locks to an average frequency of the color bursts of many display lines, any phase errors resulting from the averaging are corrected with every display line during the generation of corrected signals $\sin(\omega t)_{corr}$ and $\cos(\omega t)_{corr}$. Additionally, embodiments of the present principles support the control of sources, which are not closely constrained in SCH phase relationship.

In sum, embodiments of the principles of the present invention provide efficient techniques for correcting for phase errors between a color subcarrier and the sine and cosine signals utilized to demodulate the embedded chrominance components in a display line of video data. Advantageously, these techniques are applicable to both NTSC and PAL compliant systems, and can be complemented in relatively uncomplicated circuitry.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. Chrominance phase error correction circuitry comprising:
   a demodulator for demodulating a received video color burst signal into first and second demodulated signals;
   signal generation circuitry for providing to the demodulator an uncorrected demodulating signal for demodulating the video color burst signal, wherein the signal generating circuitry comprises a phase locked loop receiving the video color burst signal and in response generating the uncorrected demodulating signal locked in phase and frequency with the color burst signal; and
   phase correction circuitry for detecting a phase error from the first and second demodulated signals and varying a phase of the uncorrected demodulating signal relative to the phase of the video color burst signal to provide a corrected demodulating signal for demodulating a video chrominance signal with the demodulator during an active video period.

2. The chrominance phase error correction circuitry of claim 1, wherein the phase correction circuitry comprises:
   phase error detection circuitry for determining a phase correction value from an inverse tangent of a ratio of the first demodulated signal and the second demodulated signal; and
   phase adjustment circuitry for varying the phase of the demodulating signal utilizing the phase correction value.

3. The chrominance phase error correction circuitry of claim 2, further comprising averaging circuitry for averaging values of samples of each of the first and second demodulated signals, the phase error detection circuitry determining a value of the inverse tangent from an average of the values of the samples of the first demodulated signal and an average of the values of the samples of the second demodulated signal.

4. The chrominance phase error correction circuitry of claim 1, wherein the video chrominance signal is received in an YC video format and the demodulator generates first and second demodulated chrominance components in an YUV video format during the active video period.

5. The chrominance phase error correction circuitry of claim 1, wherein the chrominance video signal comprises a digital chrominance video signal.

6. The chrominance phase error correction circuitry of claim 1, wherein the phased-locked loop generates uncorrected cosine and sine signals at a color subcarrier frequency of the color burst signal.

7. A method of correcting for a phase error between a received color subcarrier and a chrominance demodulating signal comprising:
   generating with a phase locked loop an uncorrected demodulating signal locked in phase and frequency to a color burst signal received by the phase locked loop;
   demodulating the color burst signal into first and second demodulated signals with the demodulating signal;
   detecting a phase error from the first and second demodulated signals;
   varying a phase of the uncorrected demodulating signal in response to the phase error to generate a corrected demodulating signal; and
   demodulating an active video chrominance signal with the corrected demodulating signal.

8. The method of correcting for phase error of claim 7, wherein detecting a phase error from the first and second demodulated signals comprises determining a value of an inverse tangent of a ratio of the first demodulated signal and the second demodulated signal.

9. The method of correcting for phase error of claim 7, wherein detecting a phase error from the first and second demodulated signals comprises:
   averaging values of a selected number of samples of the first demodulated signal to generate an average value for the first modulated signal;
   averaging values of a selected number of samples of the second demodulated signal to generate an average value of the second demodulated signal; and
   determining a value of the inverse tangent of a ratio of the average value of the first demodulated signal and the average value of the second demodulated signal.

10. The method of correcting for phase error of claim 7, wherein demodulating the active video chrominance signal comprises demodulating a digital active video chrominance signal.

11. The method of correcting for phase error of claim 7, wherein demodulating the active video chrominance signal comprises demodulating a chrominance component of a video signal received in an YC video format into first and second chrominance components of a video signal in an YUV video format.

12. The method of correcting for phase error of claim 7, wherein generating an uncorrected demodulating signal comprises generating uncorrected sine and cosine signals at a color subcarrier frequency with the phase-locked loop in response to the color burst signal.

13. A video processing system comprising:
- a separator for separating luminance (Y) and chrominance (C) components of a composite video signal received in the YC video format;
- a chrominance demodulator for demodulating the chrominance component of the video signal in the YC video format into U and V chrominance components of a video signal in the YUV format in response to a phase-error corrected demodulating signal;
- a phase-locked loop for receiving a color burst portion of the composite signal and in response generating an uncorrected demodulating signal locked in phase and frequency to the color burst portion of the composite signal; and
- signal generation circuitry for generating the phase-error corrected demodulating signal from the uncorrected demodulating signal and U and V chrominance components demodulated from the color burst portion of the composite video signal.

14. The video processing system of claim 13, wherein the signal generation circuitry comprises:
- phase error detection circuitry for detecting a phase error from the U and V components demodulated by the chrominance demodulator from the color burst portion of the composite video signal; and
- signal phase adjustment circuitry for adjusting a phase of the uncorrected demodulating signal in response to the detected phase error to generate the phase-error corrected demodulating signal.

15. The video processing system of claim 14, wherein the phase error detection circuitry comprises circuitry for determining a value of an inverse tangent of a ratio of the V and U chrominance components demodulated from the color burst portion of the composite video signal.

16. The video processing system of claim 13, further comprising an analog to digital converter for converting the composite video signal from analog to digital form.

17. The video processing system of claim 13, further comprising a video processor for converting the U and V chrominance components into chrominance components in an YCbCr video format.

18. The video processing system of claim 13, wherein the composite video signal is in accordance with a National Television Standards Committee standard.

19. The video processing system of claim 13, wherein the composite video signal is in accordance with a Phase Alternating Line standard.

20. The video processing system of claim 13, wherein the phase error detection comprises:
- an averager for averaging values of a selected number of samples of the V component demodulated from the color burst portion to generate an average value of the V component and values of a selected number of samples of the U component demodulated from the color burst portion to generate an average value of the U component; and
- circuitry for determining a value of the Inverse tangent of a ratio of the average value of the V component and the average value of the U component.

* * * * *